UNITED STATES PATENT OFFICE.

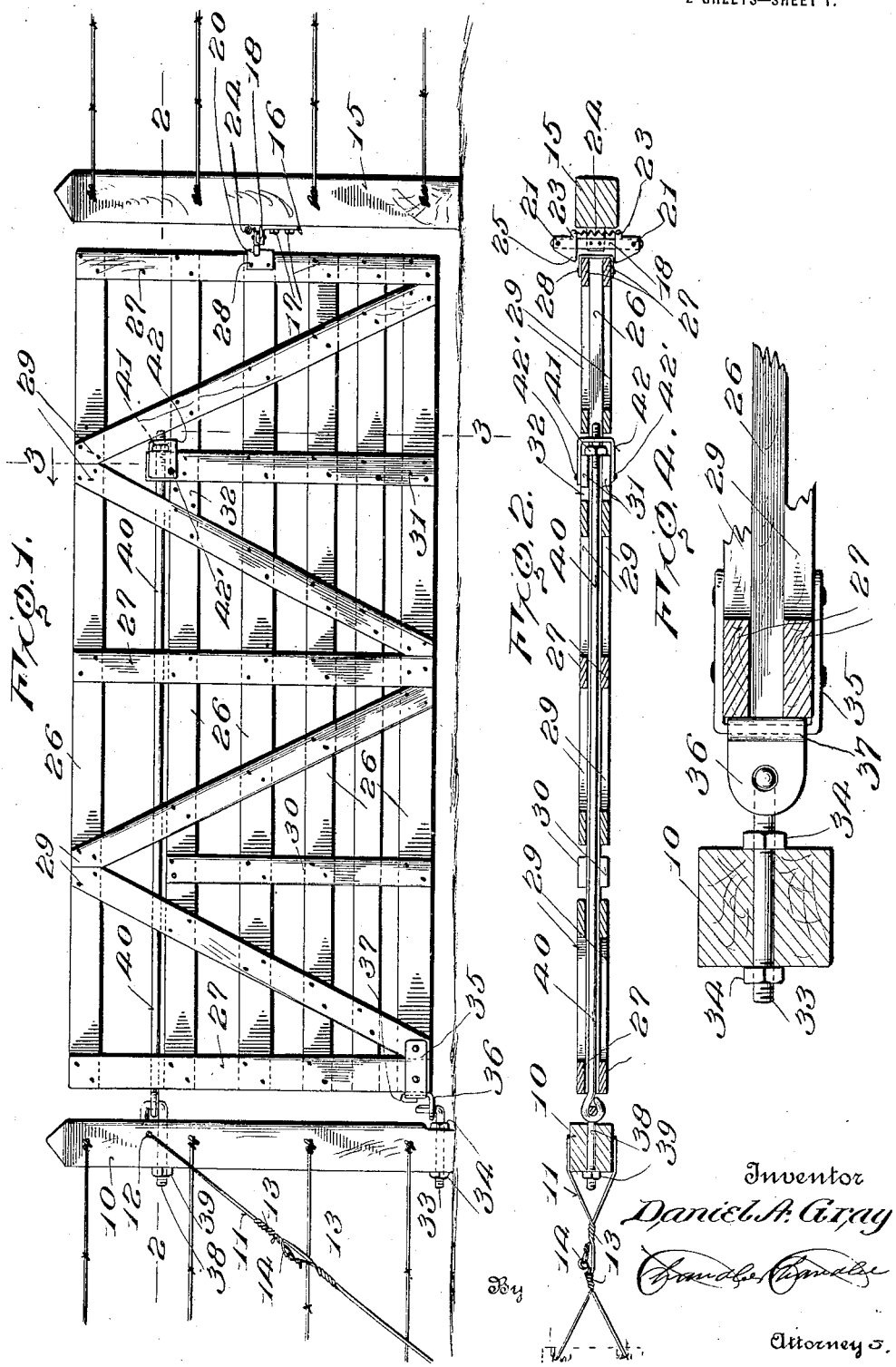

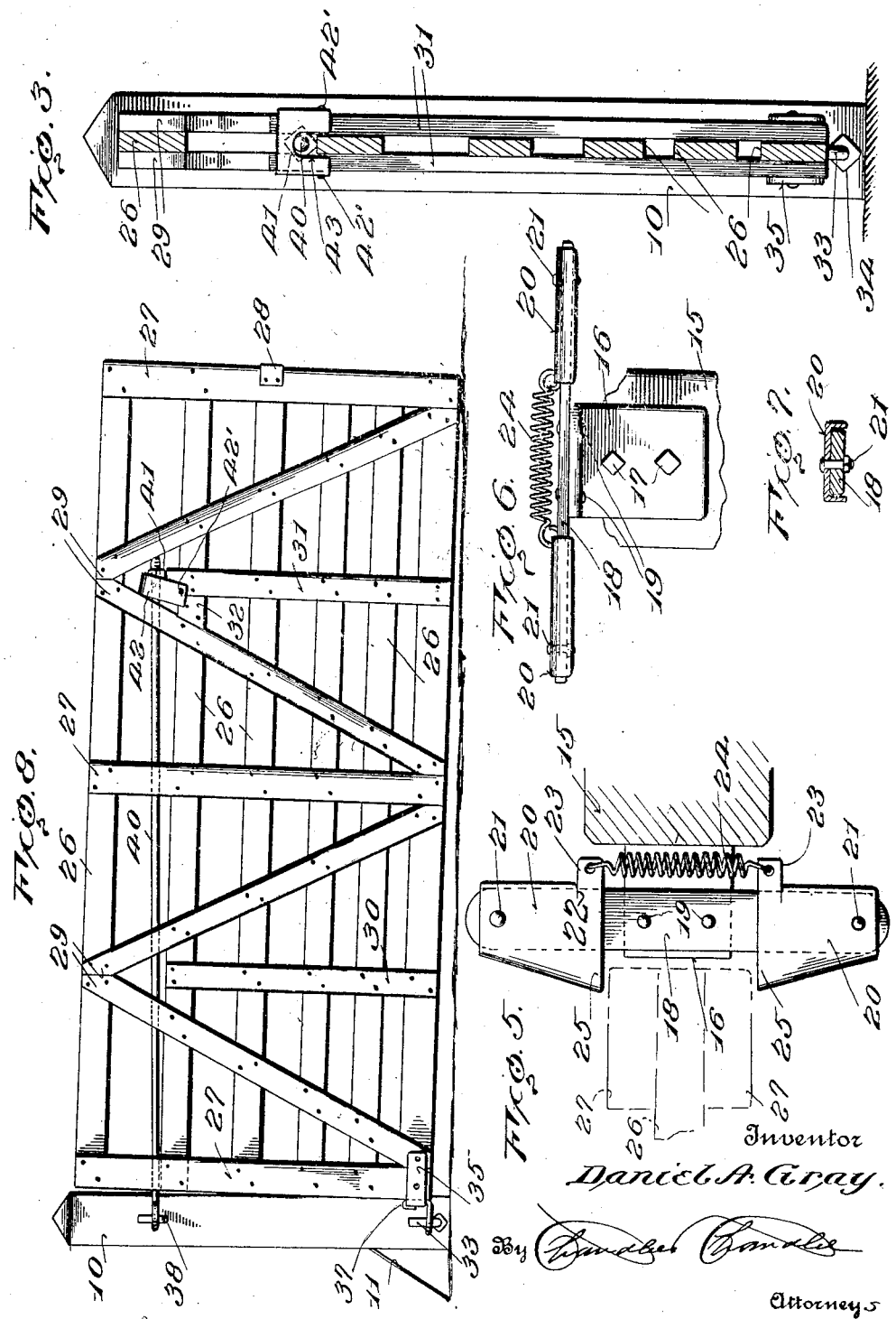

DANIEL A. GRAY, OF DES MOINES, IOWA.

FARM-GATE.

1,350,967.  Specification of Letters Patent.  Patented Aug. 24, 1920.

Application filed April 30, 1919. Serial No. 293,646.

*To all whom it may concern:*

Be it known that I, DANIEL A. GRAY, a citizen of the United States, residing at Des Moines, in the county of Polk, State of Iowa, have invented certain new and useful Improvements in Farm-Gates; and I do hereby declare the following to be a full, clear, and exact description of the invention, such as will enable others skilled in the art to which it appertains to make and use the same.

My invention has reference to the class of fences and gates therefor, and more especially, it relates to gates commonly known as "farm gates" or those used in connection with or employed to close the team entrance to the farm or residence, and particularly in rural districts.

In the class of gates above referred to, the most serious considerations are to provide a gate possessing points of advantage in simplicity and lightness; one that will not sag under its weight or in use, or which can be adjusted easily to take up sag so as to support the gate for proper swinging action on its hinges in moving to open and closed positions so that the gate will not get out of shape; to hold the gate securely in closed position or in open position at either side of the fence and entrance opening; and to accomplish these objects with a gate construction that can be economically constructed and easily set up or repaired, and which is strong and durable and not likely to get out of order.

The principal object of the invention is to provide a gate having a novel truss-rod and combined hinge construction for firmly bracing the gate for swinging action, and raising or lowering the free end thereof.

With the above objects and others in view, as will appear as the specification proceeds, the invention comprises the certain novel combinations and arrangements of parts, as will be hereinafter more particularly pointed out.

Reference is had to the accompanying drawings forming a part of this application, in which like reference characters indicate corresponding parts throughout the several views, in which:

Figure 1 is a view in elevation of the improved farm gate and latch applied thereto, the latch being viewed on edge;

Fig. 2 is a horizontal sectional view, the same being taken on the line 2—2 of Fig. 1 of the drawings;

Fig. 3 is an enlarged vertical sectional view, the same being taken on the line 3—3 of Fig. 1 of the drawings;

Fig. 4 is an enlarged detail view of the lower hinge members of the gate;

Fig. 5 is an enlarged plan view of the latch employed in connection with the gate;

Fig. 6 is an inside elevation thereof;

Fig. 7 is a cross-sectional view of the latch, and Fig. 8 is a face view of the gate in open position.

Referring to the drawings in detail, wherein I have illustrated the preferred embodiment of my invention, the numeral 10 designates the hinge post or upright support arranged at one side of the entrance intercepted by the gate, the same being suitably anchored as by being embedded in the ground and braced by a stay or guy member 11 extending diagonally to the ground. This guy member is shown as preferably comprising a single section of wire of suitable strength, rebent at both ends and having one anchored to the ground and the other extended through an aperture 12 in the post and opening at the inner and outer faces thereof. The free ends are brought together and twisted about the adjacent portions, as shown at 13, while the ends of the rebent portions are hooked and twisted about each other, as shown at 14. In this manner, the post 10 is effectively supported and braced in position to sustain the weight of the gate for swinging movement as will be hereinafter more fully specified.

The opposite post is designated by the numeral 15, being suitably anchored at the opposite side of the entrance and adapted to carry the latch in a manner to be fully described hereinafter. This latch comprises a right angular bracket 16 secured vertically against the inner face of the post 15, as by securing means 17, depending upon the nature and construction of the post carrying it. As shown, the bracket supports a transverse bar or cross-arm 18, which may be secured thereon by rivets 19, with the ends of the cross-arm projecting in opposite directions beyond the opposite faces of the post at the inner and outer sides thereof. Pivotally mounted upon the cross-arm adjacent each end thereof, is a latch plate 20, each of which comprises a channel-like plate, preferably of suitable metal, as distinguished from the wood construction of the posts and gate. That is, each plate comprising a latch member proper, comprises a blank having the opposite edges thereof bent or turned downwardly alongside the opposite edges of the cross-arm, while the plates are each pivoted to the arm adjacent the extremities thereof, as shown at 21. As the plates are widened inwardly, in the direction toward each other, and as the turned down edges or flanges thereof are spaced from the opposite edges of the cross-arm, limited pivotal movement of the plates is allowed with respect to the arm and upon the same. However, the extreme inner portions of the plates are slotted transversely, as shown at 22, the portions of the plates inwardly toward the post upon which the latch is mounted not being turned downwardly but being left extended or horizontally positioned and apertured as shown. These extended portions designated 23, are connected by means of a contractile coil spring 24, which latter is disposed adjacent the post and serves to exert strain or pull to hold the outer edges of the plates, which are disposed at right angles to the transverse edges thereof, against the outer edges of the arms, while the inner edges of the plates, which are extended at an angle, are caused to widen in their spacing from the inner edges of the arms, thus producing shoulders 25, and the plates being spaced apart, a confining space is provided for the free edge of the gate. The coöperation of the gate and the latch will be later more fully described.

The gate proper comprises a series of vertically spaced horizontal rails 26 disposed in parallel relation and connected at equidistant points with vertical slats 27 disposed on either side thereof and suitably secured thereto. These slats are preferably disposed at each end and intermediately of the length of the gate or the horizontal rails thereof, or at equal or equi-distant points along the same, depending upon the length or size of the gate and the amount of bracing required to produce a substantial structure, and to maintain the same in the form of a uniform rectangular frame. At its free edge, the gate is provided with a wear plate 28 of U-shaped formation, so as to envelop the faces of the slats at said edge, thereby having metal working against metal. Diagonal brace bars 29 are disposed upon either side of the rails between the slats, being disposed in truss-like formation, with their upper ends abutting and their lower ends engaging the lower edges of the slats.

Disposed upon opposite sides of the rails intermediately of the slats and beneath the crotch of each pair of diagonal bars, are short vertical bars 30 and 31, the former terminating at their upper ends at the top of the second rail and the bars 31 extending slightly higher and braced by reinforcing blocks 32 with the adjacent diagonal bars. As all of the vertical and diagonal bars are disposed on opposite sides of the rails in pairs, they are thus spaced apart, and a continuous channel is produced between the said bars along and above the rail adjacent to which the upper ends of the bars 30 and 31 terminate, for coöperation with the upper hinge of the gate as will now be described.

Upper and lower hinges or pivots are provided for the gate, and the lower hinge or hanger comprises a bolt 33 extending through the post 10 and held by nuts 34 at the inner and outer faces thereof, the inner end of the bolt being turned upwardly as shown. A U-shaped strap 35 is secured to envelop the lower portion of the gate and has an apertured arm 36 projecting toward the post to pivotally engage the upwardly turned end of the bolt. This arm is preferably turned upwardly between the bight portion of the strap 35 and the adjacent end of the gate, and has its upper end turned downwardly against the outer face of said bight portion, all as shown at 37, thereby making the arm rigid with the gate to assist in sustaining the weight thereof and for swinging movements at either side of the entrance and the fence in which the gate is interposed, it being understood that the fence is extended from each post.

An eye or hook bolt 38 is extended through the post 10 near its upper end, as distinguished from the location of the bolt 33 near the lower end thereof, being held by a nut 39. The eye or hook is vertically disposed and is pivotally engaged by a long eye-bolt or truss rod 40, the eye of which is horizontally disposed, while the rod extends along the top of the second rail 26 above referred to and between the bars at either side thereof. It also extends through the fork formed by the spaced upper ends of the bars 31 and has mounted on the threaded end thereof a nut 41 designed for binding engagement with the edges of the bars 31. However, there is disposed against or pivotally secured to the outer faces of said ends at either side of the rod and the adjacent rail, a yoke 42 having its closed or bight portion notched in its lower edge at 43 to receive the rod therethrough but for engagement of the nut 41 therebehind and held against outward displacement by having the bight portion spaced from the bars so as to prevent stock from raising the gate and opening it, although permitting this by persons after raising the yoke on its pivots 42'. In this manner, the gate is effectively hung from the post 10 and will not sag under its weight or in use under ordinary circumstances. However, the gate can be readily hung and removed from its hangers or bearings produced by the hinges, as well as the hang of the gate regulated by adjusting the nut on the rod to shorten or lengthen the truss rod to raise or lower the free end of the gate, and thereby prevent sagging as well as to insure proper hang. The gate may be opened by depressing the latch plate at one side or the other depending upon the side at which it is desired to open the gate, the spring being stretched during such action and serving to return the latch plate to normal position, while the action is automatic when the gate is being engaged at its closing point. On the other hand, when it is desired to open the gate and allow it to remain open, the gate is swung in the desired direction and the gate tilted upwardly at its free end, after the pressure between the nut 41 and the yoke 42 is released by raising the yoke, to permit upward displacement of the truss rod on its pivot, so that when the gate is allowed to drop, it will rest on the ground and will remain open, notwithstanding the fact that there may be a strong wind. Also, when the gate is closed, it will be positively held by the latch from going beyond either side of the post, although it may be operated at either side. The construction also bears out the points of advantage specified in the objects.

Having thus described my invention, what I claim and desire to secure by Letters Patent of the United States of America, is:

1. The combination with a hinge post having hangers, and a gate hingedly mounted at its inner end on the lower hanger; of a fork fixedly carried by the gate near its outer end, a truss rod mounted loosely within the gate body, its inner end projecting beyond the gate and hingedly engaging the upper hanger and its outer end lying normally in said fork and threaded, a nut on the threads adapted to be tightened against the fork, and a yoke carried by the fork and adapted to be engaged with the rod beyond the nut.

2. The combination with a hinge post having hangers, and a gate hingedly mounted at its inner end on the lower hanger, the gate body including rails and a pair of upright bars secured to opposite faces of the rails with their upper ends rising above the second rail and spaced to produce a fork standing beneath the top rail near the free end of the gate; of a truss rod disposed between the first and second rails with its inner end projecting beyond the gate and pivoted on the upper hanger and its outer end lying normally in said fork and threaded, a nut on the threads against the outer edges of the fork-arms, and a U-shaped yoke pivoted astride the fork-arms and having its bight notched and adapted to drop over the threaded end of the rod beyond its nut, as described.

In testimony whereof, I affix my signature, in the presence of two witnesses.

DANIEL A. GRAY.

Witnesses:
J. L. GILLESPIE,
H. S. CONNOR.